United States Patent
Kato

(10) Patent No.: US 7,207,759 B2
(45) Date of Patent: Apr. 24, 2007

(54) FASTENER FOR PANELS OR THE LIKE

(75) Inventor: Hiroyuki Kato, Utsunomiya (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/013,383

(22) Filed: Dec. 17, 2004

(65) Prior Publication Data

US 2005/0152765 A1    Jul. 14, 2005

(30) Foreign Application Priority Data

Dec. 25, 2003 (JP) ............................. 2003-428682

(51) Int. Cl.
  *F16B 13/06* (2006.01)
  *F16B 19/00* (2006.01)
(52) U.S. Cl. ............................. 411/45; 411/46; 411/47; 411/48; 411/41; 411/508; 411/509; 411/510; 411/913
(58) Field of Classification Search ............ 411/45–48, 411/41, 508–510, 913
  See application file for complete search history.

(56) References Cited

U.S. PATENT DOCUMENTS

| | | | | |
|---|---|---|---|---|
| 3,112,547 A | * | 12/1963 | Poe ............................ | 411/80.2 |
| 3,606,814 A | * | 9/1971 | MacKenzie ................ | 411/80.2 |
| 3,918,130 A | * | 11/1975 | Poe ............................ | 24/453 |
| 4,114,509 A | * | 9/1978 | Poe ............................ | 411/80.2 |
| 4,276,806 A | * | 7/1981 | Morel ........................ | 411/41 |
| 4,637,765 A | * | 1/1987 | Omata ........................ | 411/41 |
| 4,757,664 A | * | 7/1988 | Freissle ...................... | 52/509 |
| 4,874,276 A | * | 10/1989 | Iguchi ........................ | 411/48 |
| 4,927,287 A | * | 5/1990 | Ohkawa et al. .......... | 403/408.1 |
| 4,952,106 A | * | 8/1990 | Kubogochi et al. ........... | 411/48 |
| 5,286,152 A | * | 2/1994 | Anderson .................... | 411/45 |
| 6,039,523 A | * | 3/2000 | Kraus ........................ | 411/48 |
| 6,364,586 B1 | * | 4/2002 | Okada ........................ | 411/41 |
| 6,514,024 B2 | | 2/2003 | Akema et al. | |
| 6,769,849 B2 | * | 8/2004 | Yoneoka ..................... | 411/45 |
| 6,979,162 B2 | * | 12/2005 | Kato ........................ | 411/371.1 |
| 2004/0109737 A1 | * | 6/2004 | Kato ........................ | 411/55 |
| 2005/0123372 A1 | * | 6/2005 | Sato ........................ | 411/32 |

FOREIGN PATENT DOCUMENTS

| | | |
|---|---|---|
| JP | 57-104007 | 6/1982 |
| JP | 6-69417 | 9/1994 |
| JP | 2000-8102 | 3/2000 |

* cited by examiner

*Primary Examiner*—Robert J. Sandy
*Assistant Examiner*—David Reese
(74) *Attorney, Agent, or Firm*—Miles & Stockbridge P.C.

(57) ABSTRACT

A fastener comprises a pin and a bushing having a hollow shank that is inserted into holes in a plurality of members being attached. A pin shank is inserted into the bushing shank to effect a widened-diameter coupling condition in which the diameter of the bushing shank is widened, and the members being attached are coupled between the diameter-widened bushing shank and a bushing flange. On the bushing shank are pawls for maintaining a non-widened-diameter coupling condition in which the pin and the bushing are coupled with the pin shank partially inserted into the bushing shank, and the diameter of the bushing shank is not widened. On the pin shank there is a groove for engaging the pawls, which normally extend out beyond the diameter of the attachment holes, but can bend inward. The groove has a depth that will accept the pawls when they are bent inward.

11 Claims, 5 Drawing Sheets

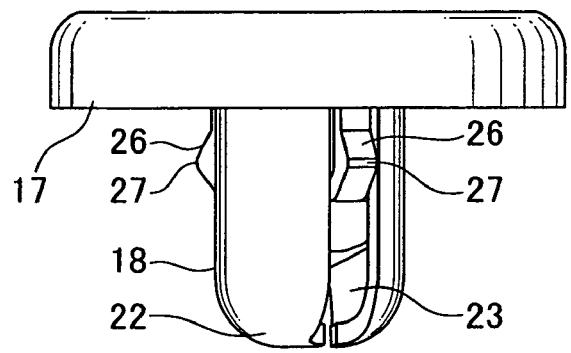
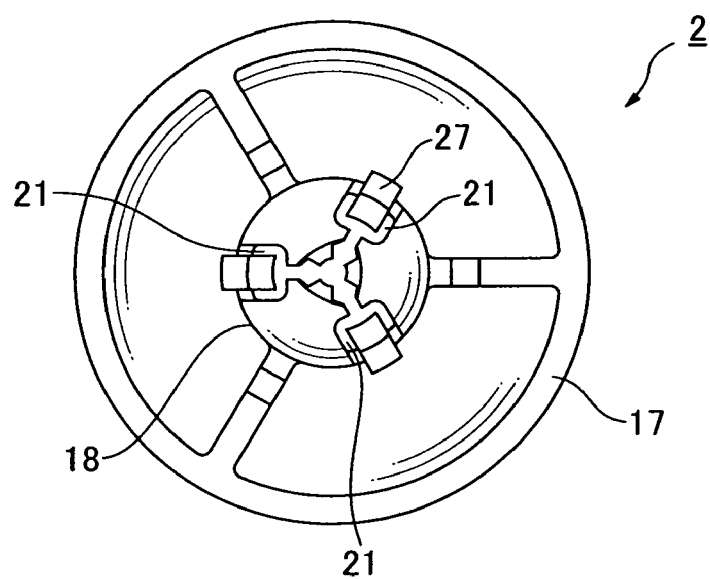
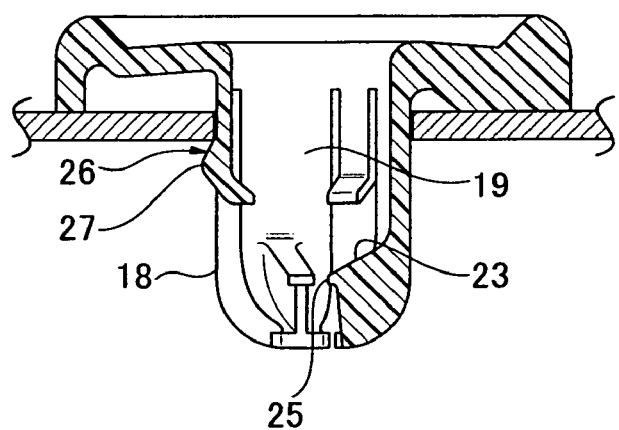

FASTENER FOR PANELS OR THE LIKE

CROSS-REFERENCE TO RELATED APPLICATION

This application claims the benefit of Japanese Patent Application No. 2003-428682 filed Dec. 25, 2003, incorporated herein by reference.

BACKGROUND OF THE INVENTION

This invention relates to an improvement in a fastener for panels or the like, of the type comprising a bushing having a hollow shank that is inserted into holes in members such as panels to which the fastener is to be attached, and a pin having a shank that is inserted into the shank of the bushing.

One such fastener is disclosed in U.S. Pat. No. 4,276,806 (Patent Literature 1). Prior to use of this fastener, the pin and the bushing are connected by a thin piece to prevent loss of either part of the fastener. In use, the bushing shank can be inserted into an attachment hole in a first member and secured thereto preliminarily. Then, the bushing shank can be inserted into an attachment hole in a second member and secured thereto by the expansion of bushing parts beyond the diameter of the attachment hole in the second member. Insertion of the pin into the hollow bushing shank maintains a widened-diameter coupling condition in which the expansion of the bushing is maintained.

Japanese Laid-Open Utility Model Application No. S57-104007/1982, gazette publication (Patent Literature 2) discloses another pin-bushing type of fastener. With this fastener, the pin and the bushing are separate, and the pin shank is inserted into a hollow part of the bushing shank which has been inserted into attachment holes in a first member and a second member, so as to maintain a widened-diameter coupling condition in which the first and second members are coupled to one another. In an embodiment shown in FIG. 9(b) of this Patent Literature 2, there is a configuration in which the fastener can be coupled to the first member preliminarily.

Japanese Laid-Open Patent Application No. 2000-81012, gazette publication (Patent No. 2980897, gazette publication: Patent Literature 3) discloses a pin-bushing type of fastener wherein the pin and the bushing are separate as in Patent Literature 2. With this fastener also, the bushing can be pre-fastened to a first member, and then the bushing shank can be inserted into an attachment hole in a second member, and the pin completely pushed into the bushing to maintain a widened-diameter coupling condition.

Yet another pin-bushing type of fastener wherein the pin and bushing are separate is disclosed in Japanese Laid-Open Utility Model Application No. H6-69417/1994, gazette publication (Utility Model Registration No. 2581249: Patent Literature 4). With this fastener also, after the bushing has been inserted into attachment holes in first and second members, when the pin is inserted completely into the bushing shank, a widened-diameter coupling condition is maintained. In this fastener, there is no suggestion of pre-attaching the bushing to a first member, but there is a configuration wherein the pin and the bushing are coupled with the pin shank pushed part way into the bushing shank, so that neither of the pin and bushing is likely to be lost. In the condition wherein the pin is pushed part way into the bushing, the diameter of the bushing shank is not widened. Then by pushing the bushing shank into an attachment hole in a member and completely pushing the pin into the bushing, a widened-diameter coupling condition is maintained in which the first and second members are coupled to one another.

With the fasteners disclosed in Patent Literature 1 to 3 noted above, the fastener or the bushing can be pre-attached to a first member, so that when the bushing shank is inserted into a second member, a worker does not have to hold both the first member and the fastener separately, and the insertion operation is easily performed. However, with the fasteners described in Patent Literature 2 and Patent Literature 3, the pin and bushing are separate, and there is a danger of losing one or the other, which is undesirable. The fastener of Patent Literature 1 is formed so that, when not in use, the pin and bushing are coupled with a thin-material piece, so one or other of the parts will not be lost, but the thin-material piece breaks easily, and if it breaks due to a worker's mistake prior to use, the pin will be separated from the bushing, and there is a danger of one part being lost. With the fastener of Patent Literature 4, the pin and bushing are coupled in a non-widened-diameter coupling condition, so the danger of such loss is reduced. However, pre-attachment to a first member is not contemplated, so that when the bushing shank is inserted into a second member, the worker is obliged to hold both the first member and the fastener. This reduces efficiency in work flow on an automobile manufacturing line or the like, for example.

BRIEF DESCRIPTION OF THE INVENTION

Accordingly, an object of the present invention is to provide a fastener wherein a pin and a bushing are coupled in a non-widened-diameter coupling condition, to reduce the danger of either part being lost, and which can be pre-attached to one of two members to be coupled by the fastener.

In a preferred, but non-limiting, embodiment of the present invention, a fastener for panels or the like comprises a pin and a bushing having a hollow shank that can be inserted into holes in members such as panels. In this fastener, the bushing shank has pawls (at least one pawl) for maintaining a non-widened-diameter coupling condition in which the pin and the bushing are coupled, with the pin shank inserted part way into the bushing shank, the diameter of which is not widened. The pin shank has a circumferential groove, which forms a shoulder for engaging tips of the pawls in the non-widened-diameter coupling condition. The pawls are formed so as normally to extend out beyond the diameter of the attachment hole in a first member such as a panel, so as to couple the fastener to the first member preliminarily, but are elastic so as to be capable of being bent inward by an external force. The depth of the groove in the pin is sufficient to accept the tips of the pawls which have been bent inward, so that they do not to impede the insertion of the bushing shank into the attachment hole in a second member. When a shank of the pin is fully inserted into the hollow shank of the bushing, a widened-diameter coupling condition is provided in which the diameter of the bushing shank is widened to couple the first and second member to one another.

As described in the foregoing, the tips of the pawls of the bushing shank engage the shoulder of the groove of the pin shank in a non-widened-diameter coupling condition, so that loss of one or the other of the pin and bushing is unlikely. The pawls normally extend out beyond the diameter of an attachment hole in a first member. When the bushing shank is inserted into the attachment hole, the pawls bend to the inside, but after passing through the attachment hole, they again extend to the outside of the attachment hole and temporarily hold the fastener to the first member, so that pre-attachment can be effected. When the bushing shank is inserted into an attachment hole in a second member, a worker does not need to hold both the first member and the fastener separately, so the insertion operation is easily performed, and the reduction in work efficiency and work flow is eliminated.

In the fastener described in the foregoing, it is preferable that the bushing shank be divided by vertical slits to permit the diameter thereof to be readily widened, and that the pawls be formed so as to extend in corresponding slits from the bushing flange part way along the bushing shank. Thereby, if the pin shank is pushed partially into the bushing shank, a non-widened-diameter coupling condition can easily be realized. It is also preferable that an inward projection be formed in the bushing shank, near its tip, so that when the tip is extended outward by the pin shank being further inserted into the bushing shank from the non-widened-diameter coupling condition, the inward projection can engage the groove in the pin shank and maintain a widened-diameter coupling condition. The pawls have parts that extend out beyond the diameter of the attachment hole in the first member when the pin and the bushing are in the non-widened-diameter coupling condition. It is preferable that the pawls have surfaces that incline inwardly from the extending parts toward the tip end of the bushing shank and also toward the flange of the bushing. Thereby, not only is insertion of the bushing shank into an attachment hole of a member made easy, but the fastener, when pre-attached to a first member, can be readily removed or reattached in cases of an attachment mistake or for replacement or the like.

BRIEF DESCRIPTION OF THE DRAWINGS

The invention will be further described in conjunction with the accompanying drawings, which illustrate a preferred (best mode) embodiment, and wherein:

FIG. 4 is a front elevation view of the bushing shown in FIG. 3;

FIG. 5 is a bottom view of the bushing shown in FIG. 3;

FIG. 6 is a sectional view at line VI—VI in the bushing shown in FIG. 3;

DETAILED DESCRIPTION OF THE INVENTION

Figure 1:
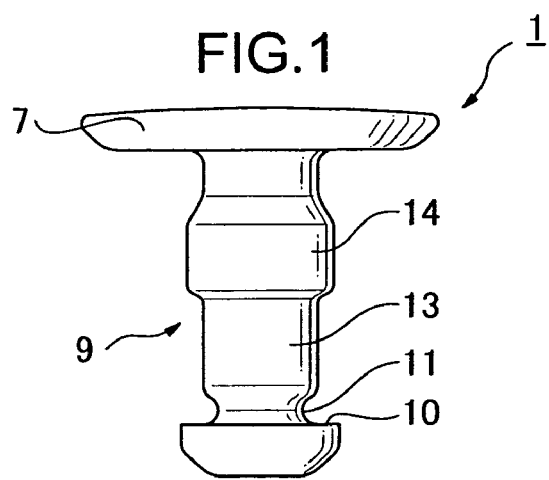
FIG. 1 is a front elevation view of the pin of a fastener relating to one embodiment of the present invention.
Figure 2:
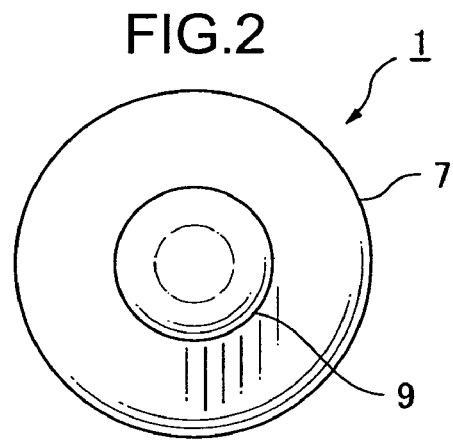
FIG. 2 is a bottom view of the pin shown in FIG. 1.
Figure 3:
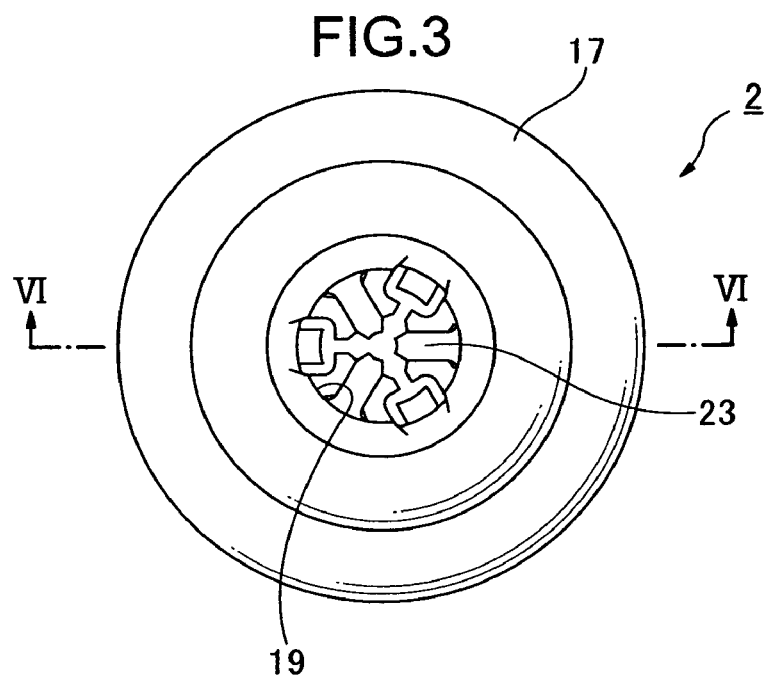
FIG. 3 is a top view of the bushing of a fastener relating to one embodiment of the present invention.
Figure 7:
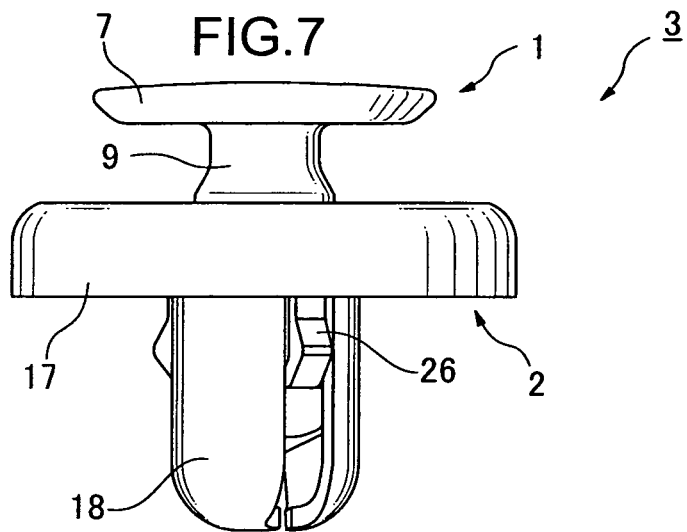
FIG. 7 is a front elevation view of a fastener relating to one embodiment of the present invention.
Figure 11:
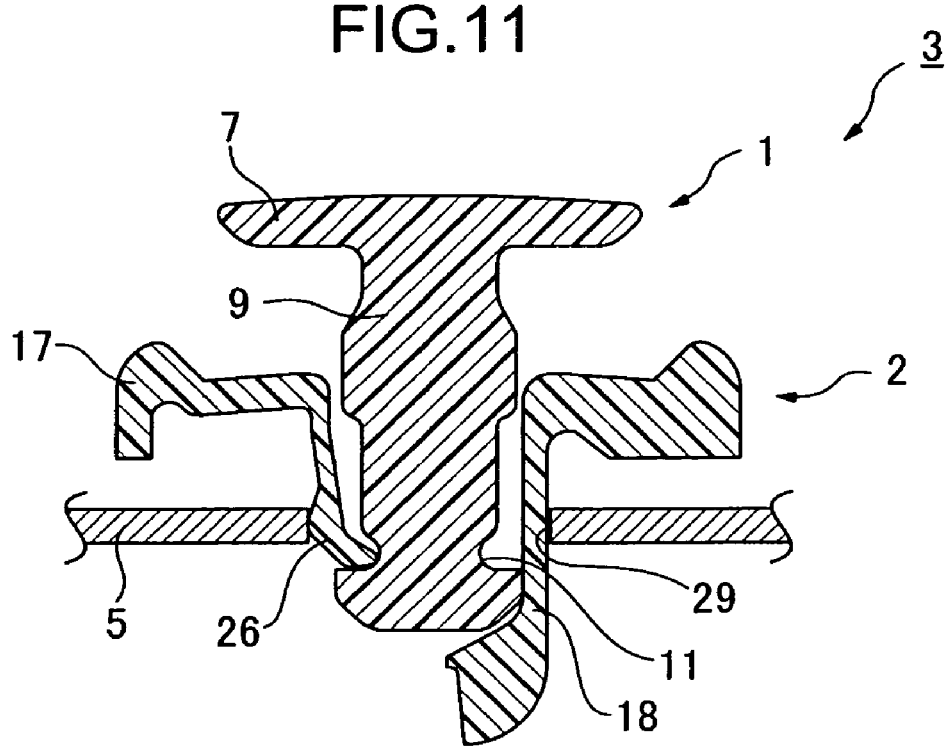
FIG. 11 is a similar view showing the fastener of FIG. 10 partially inserted in an attachment hole of a first member.
Figure 12:
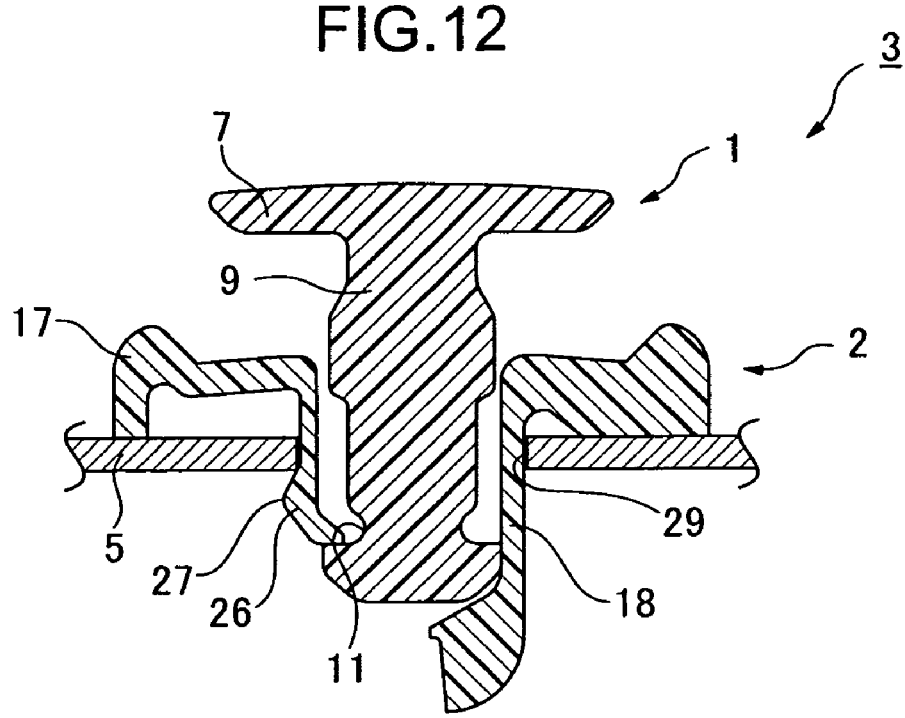
FIG. 12 is a similar view showing the condition of the fastener shown at FIG. 11 temporarily attached to the first member.
Figure 13:
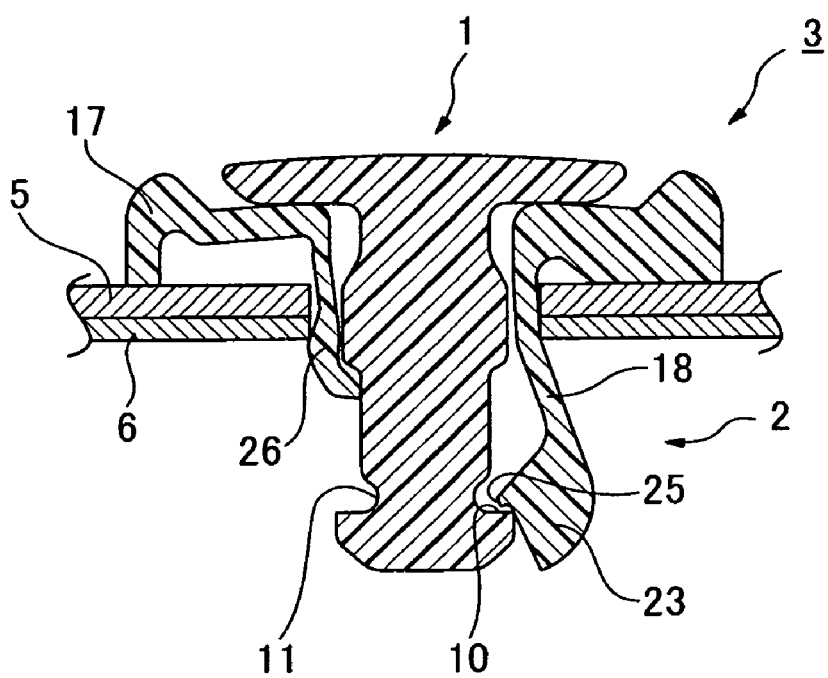
FIG. 13 is a similar view showing the condition of the first member coupled to a second member by the fastener.

A preferred embodiment of the present invention will now be described with reference to the drawings. FIGS. 1 to 10 show a pin-bushing type fastener 3 for panels or the like, comprising a plastic pin 1 and a plastic bushing 2. More specifically, FIGS. 1 and 2 show the pin 1; FIGS. 3 to 6 show the bushing 2; and FIGS. 7 to 10 show the fastener 3 with the pin 1 and bushing 2 coupled in a non-widened-diameter coupling condition. FIGS. 11 to 13 show how a first member 5 such as a panel is coupled to a second member 6 such as a panel, using the fastener 3.

The pin 1 will now be described in detail with reference to FIG. 1 and FIG. 2. The pin 1 comprises a head 7 shaped as a circular flange, and a shank 9 extending from the head 7. The shank 9 has a tapered tip and has an outer diameter that can be inserted into a hollow part of the bushing shank. In the shank 9, near the tip end (the lower end in FIG. 1), a groove 11 is formed about the entire circumference, providing a shoulder 10 for engaging pawls in the bushing shank. The groove 11 has a depth in the radial direction designed to accept pawls of the bushing shank that are not bent inward in the radial direction, and also pawls that are bent inward in the radial direction. The part 13 of the shank 9 above the groove 11 has a diameter designed to engage the pawls of the bushing shank when the pin shank 9 is pushed completely into the bushing shank. An upper part 14 of the shank 9 has a diameter which approximates the inner diameter of the bushing shank, so that the pin shank 9 will not rattle inside the bushing shank in the fully attached condition in which the pin shank 9 is pushed completely into the bushing shank.

The bushing 2 will now be described in detail with reference to FIGS. 3 to 6. The bushing 2 comprises a circular flange 17 and a shank 18 extending from the flange 17. In the bushing flange 17 and the shank 18 there is a bore 19, with a radial dimension designed so that the pin shank 9 can be inserted therein. The diameter of the bushing flange 17 is larger than the diameter of the attachment hole in the first member 5. The diameter of the shank 18 is smaller than that of the attachment holes to permit insertion into the attachment holes in the first member 5 and the second member 6. The tip parts 22 of the shank 18 are tapered to facilitate insertion. The shank 18 is divided into three parts by three vertical slits 21 so that the diameter thereof can widen. On the inside of the tip parts 22, three ribs 23 extend in the radial direction so as to narrow the diameter of the bore 19 and are formed at intervals of 120 degrees in the circumferential direction. When the pin shank 9 is pushed completely into the bushing shank 18, the diameter of the bushing shank 18 widens substantially and a widened-diameter coupling condition is attained.

On the tip ends of ribs 23, small projections 25 are formed (see FIG. 6). When the pin shank 9 is pushed completely into the bushing shank 18, the shoulder 10 at the tip end of the pin shank 9 engages the projections 25, and the pin 1 and bushing 2 are held in a widened-diameter coupling condition in which the diameter of the shank 18 is widened. The slits 21 in the shank 18 divide the shank 18 into three legs at intervals of 120 degrees about the circumference. By forming the shank 18 in a multiple-leg shape, it is easy to insert the bushing shank into the attachment holes in the first member 5 and the second member 6, with the tip parts 22 bending toward the inside, and, when the pin 1 is inserted further from the non-widened-diameter coupling condition to the widened-diameter coupling condition, the tip parts 22 of the shank 18 bend readily to the outside, and the coupling operation is easy.

In the bushing shank 18, in each of the vertical slits 21, an elastic pawl 26, the tip of which protrudes inward in the radial direction of the shank 18, is formed so as to extend from the flange 17 part way along the bushing shank 18. These pawls 26 are best seen in FIG. 6. When the pin shank 9 is pushed part way into the bushing shank 18, the tips of the pawls 26 engage the shoulder 10 of the groove 11 formed near the tip end of the pin shank 9, and maintain a non-widened-diameter coupling condition in which the pin and the bushing are coupled but the diameter of the bushing shank 18 is not widened. The fastener 3 is shown in the non-widened-diameter coupling condition in FIGS. 7, 9, and 10.

As shown in FIG. 6, each of the pawls 26 has an extending part 27 that normally extends outwardly beyond the outer circumferential surface of the bushing shank 18. In the present invention, the extending parts 27 extend beyond the diameter of the attachment hole in the first member. The pawls 26 have the flexibility to be bent inward in the radial direction of the bushing shank 18 by forces from the outside. As already described, the groove 11 is formed near the tip end of the pin shank 9, and has a depth designed to accept the tips of the pawls 26 that are bent inward by forces applied to the extending parts 27 of the pawls 26 in the inner radial direction when the bushing shank 18 is inserted into the attachment hole in the first member. Thus the extending parts 27 of the pawls 26 retract inward in the radial direction, so that the pawls 26 do not impede the insertion of the bushing shank 18 into an attachment hole.

As stated, pawls 26 are formed so as to extend in the vertical slits 21 from the flange 17 part way along the bushing shank 18, and if the pin shank 9 is partially pushed into the bushing shank 18, the non-widened-diameter coupling condition can be realized. The extending parts 27 of the pawls 26 extend out beyond the diameter of the attachment holes in the members being attached under different conditions, including the condition wherein the pin 1 and the bushing 2 are coupled in the non-widened-diameter coupling condition. As stated, the pawls 26 are formed so as to incline gradually from the extending parts 27 toward the tip end of the bushing shank and toward the flange end. Thereby, not only is insertion of the bushing shank 18 into an attachment hole made easy, but the fastener 3, when pre-attached to a first member, can be removed or reattached in cases of an attachment mistake or for replacement or the like.

Figure 10:
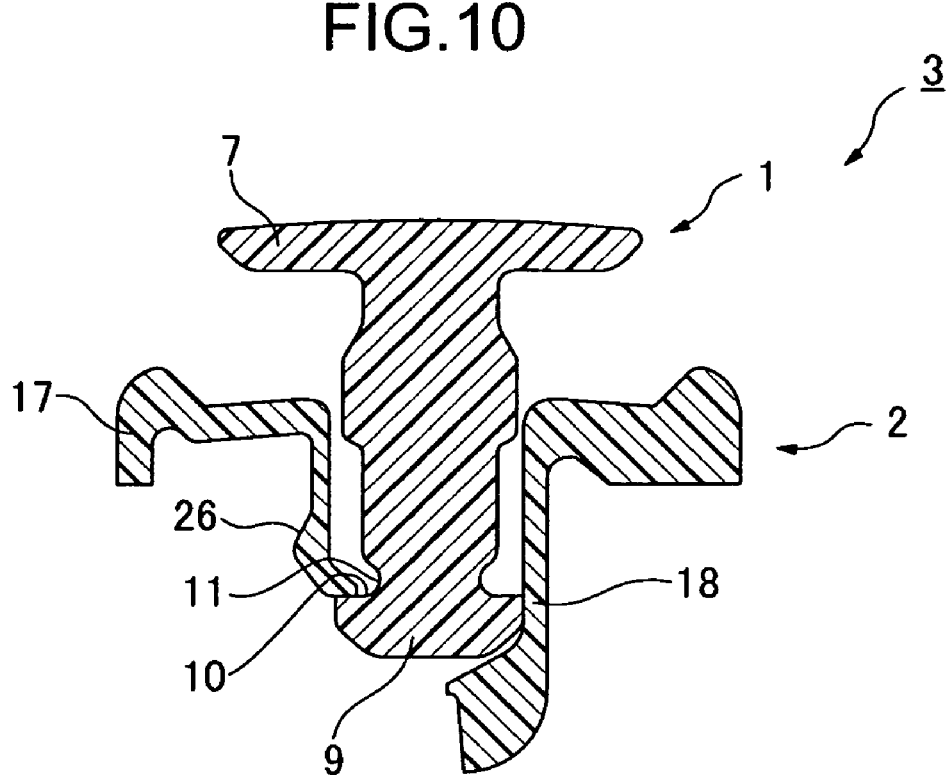
FIG. 10 is a sectional view at line X—X in the fastener shown in FIG. 8.

FIGS. 7 to 10 show the fastener 3 when the pin 1 and the bushing 2 are coupled in the non-widened-diameter coupling condition. When the pin shank 9 has been partially inserted into the bushing shank 18, as shown in FIG. 10, the tips of the pawls 26 engage the shoulder 10 of the groove 11 in the pin shank 9, and prevent the pin 1 from coming out of the bushing 2. In this non-widened-diameter coupling condition, the pawls 26 are accommodated inside the groove 11, in a relaxed attitude with no external forces acting thereon, so that the pawls 26 will not exhibit creeping deformation. The fastener 3 comprising the pin 1 and the bushing 2 may be handled, shipped, and managed as a single product, and then used in making a coupling to a panel or the like. When the fastener is inserted into an attachment hole in the first member 5, for example, as shown in FIG. 11, the pawls 26 are bent further into the groove as they enter the attachment hole in the first member and then return to their relaxed attitude as they pass through the attachment hole, as shown in FIG. 12.

Figure 8:
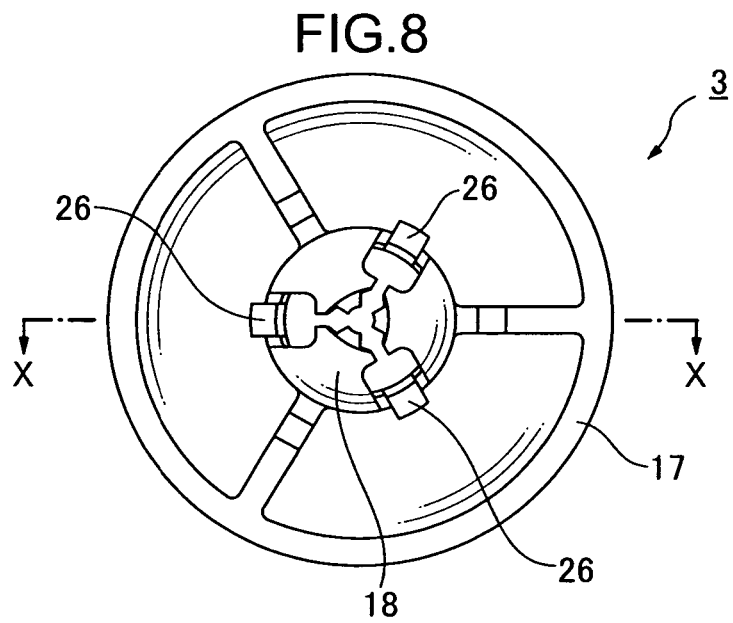
FIG. 8 is a bottom view of the fastener shown in FIG. 7.
Figure 9:
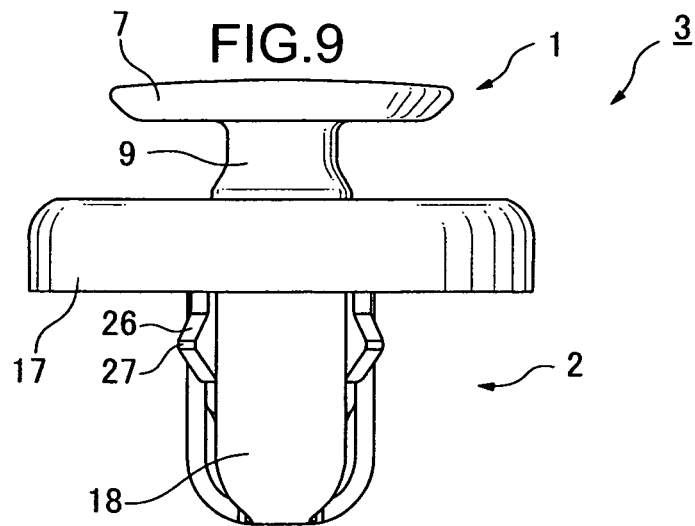
FIG. 9 is a right side elevation view of the fastener shown in FIG. 7.

Referring now to FIGS. 11 to 13, the operation of using the fastener 3 to couple a first member 5 such as a panel to a second member 6 such as a panel will be described. In FIG. 11 the bushing shank 18 is partially inserted into an attachment hole 29 in the first member 5. Initially, the pawls 26 extend from the outer surface of the bushing shank 18 beyond the outside of the attachment hole 29, but, because the depth of the groove 11 in the pin shank 9 is sufficient, as the insertion begins the pawls 26 will bend toward the inside of the bushing shank 18 and cease to extend outward, so that the bushing shank 18 can be inserted into the attachment hole 29 of the first member 5. After insertion, as shown in FIG. 12, the extending parts 27 of the pawls 26 will have passed through the attachment hole 29 and will return to their original condition due to their elasticity, so that the extending parts 27 will engage the first member 5 outside attachment hole 29, and the fastener 3 will be temporarily fastened to the first member 5. In the embodiment, three pawls 26 are provided, as shown in FIG. 8, so that the force of engagement with the first member 5 is great, and the force of the coupling of the temporary fastening is great. When the bushing shank 18 is inserted into an attachment hole in the second member 6, the burden of a worker having to hold both the first member 5 and the fastener 3 separately is eliminated, so the operation is easy to perform, and reduction in work efficiency and work flow is eliminated.

In order to couple the first member 5 to the second member 6, the bushing shank 18 is inserted into an attachment hole in the second member 6, in a condition in which the bushing 2 and the pin 1 are coupled in the non-widened-diameter coupling condition. After such insertion, the shank of the pin 1 is completely inserted into the shank of the bushing 2 merely by pressing on the head 7 of the pin 1 of the fastener 3 with a finger or the like so that the pin head becomes proximate to the flange 17 of the bushing 2. Thereby, the tip of the pin shank 9 pushes apart the ribs 23 at the tip of the bushing shank 18, widening the diameter of the bushing shank 18, so that the first member 5 and the second member 6 are held together between the diameter-widened parts of the bushing shank 18 and the flange 17 of the bushing, as shown in FIG. 13. When the pin shank 9 is inserted completely into the bushing shank 18, the shoulder 10 near the tip of the pin shank 9 engages the projections 25 on the ribs 23, and the pin 1 and the bushing 2 are held in a widened-diameter coupling condition in which the diameter of the shank 18 is widened. In this condition, the pawls 26 engage the portion of the pin shank 9 above the groove 11.

It is preferable that the diameter of the head 7 of the pin 1 be smaller than the diameter of the bushing flange 17, and that the perimeter of the head 7 be undercut such that, when the pin head 7 is in close proximity to the bushing flange 17, a gap is formed which will permit the insertion of the tip of a tool such as a flat screwdriver to pry the pin head 7 away from the bushing flange 17. Thereby, the groove 11 in the tip of the pin shank 9 will be forced to disengage from the projections 25 of the ribs 23 in the shank 18, and the pin shank 9 can be withdrawn from the bushing shank 18 to permit the fastener to be withdrawn from the first and second members.

While a preferred embodiment of the invention has been shown and described, it will be apparent that changes can be made without departing from the principles and spirit of the invention, the scope of which is defined in the accompanying claims.

What is claimed is:

1. A fastener comprising a pin and a bushing having a flange and having a hollow shank for insertion into an attachment hole in a member, the pin having a shank for insertion into the hollow shank of the bushing to provide a widened-diameter coupling condition in which the bushing shank has a widened diameter, wherein:

the bushing shank has a plurality of pawls, the pin shank has a groove for accepting and engaging the pawls in a non-widened-diameter coupling condition in which the pin and the bushing are coupled with the pin shank partially inserted into the bushing shank and in which the diameter of the bushing shank is not widened, the pawls are formed so as normally to extend out beyond the bushing shank and have elasticity so that the pawls can be bent inward by an external force applied thereto as the bushing shank is inserted in the attachment hole, and the groove has a depth that is sufficient to accept the inwardly bent pawls so that the pawls do not impede insertion of the bushing shank into an attachment hole, wherein the bushing shank is divided into separate parts by longitudinal slits to facilitate widening thereof, and the pawls extend in corresponding slits part way along the bushing shank from the bushing flange and are individually mounted on the bushing shank for movement inward and outward of the bushing shank relative to the separate parts of the bushing shank.

2. The fastener described in claim 1, wherein each of the pawls has a part which, when the pin and the bushing are in the non-widened-diameter coupling condition, extends out beyond an attachment hole, and the pawls are formed so as to incline inwardly from the extending parts toward the tip of the bushing shank and toward the bushing flange.

3. A fastener comprising a pin and a bushing, wherein:

the bushing has a flange with a shank extending therefrom and a bore extending through the flange and into the shank, the pin has a head with a shank extending therefrom dimensioned for insertion into the bore of the bushing shank, the bushing shank has parts that expand when the pin shank is substantially fully inserted into the bushing shank, the bushing shank has an elastic pawl mounted on the bushing shank for movement inward and outward of the bushing shank relative to the parts of the bushing shank and the pin shank has a groove for receiving a tip of the pawl to couple the pin and the bushing with the pin shank partially inserted into the bushing shank and without expansion of the parts of the bushing shank, and the pawl has a part extending from the bushing shank for attachment of the fastener to a member having a hole into which the bushing shank is inserted, wherein the elasticity of the pawl is such that the pawl can be bent inward by an external force applied thereto as the bushing shank is inserted in the hole, and the depth of the groove is sufficient to accept the inwardly bent pawl so that the pawl does not impede insertion of the bushing shank into the hole.

4. A fastener according to claim 3, wherein the pawl has inwardly inclined surfaces at opposite sides of the extending part.

5. A fastener according to claim 3, wherein tip portions of the pin shank and tip portions of the bushing shank have mutually engageable elements that maintain the expansion of the bushing shank.

6. The fastener described in claim 3, wherein the pin has a tip at an end opposite to the head, the groove is adjacent to the tip, the pin shank has a thick portion spaced from the tip and located in the hole when the pin shank is substantially fully inserted into the bushing shank, the pin shank has a constant diameter thinner portion extending between the groove and the thick portion, and the tip of the pawl engages the thinner portion adjacent to the thick portion when the pin shank is fully inserted in the bushing shank.

7. A pin and bushing fastener coupled to a member, wherein:

the bushing has a flange and a shank extending therefrom through a hole in the member, the bushing has a bore extending through the flange and into the shank, the pin has a head and a shank extending therefrom partially inserted into the bore of the bushing, the bushing has a pawl pivotally extending from the flange end of the bushing and supported for movement inward and outward relative to the bushing shank independently of the bushing shank with a part extending out beyond the hole in the member at one side of the member, with the bushing flange juxtaposed with another side of the member, the pin has a groove in which a tip of the pawl is received for coupling the pin and the bushing with the pin shank partially inserted into the bushing shank, the elasticity of the pawl is such that the pawl can be bent inward by an external force applied thereto as the bushing shank is inserted in the hole, and the depth of the groove is sufficient to accept the inwardly bent pawl so that the pawl does not impede insertion of the bushing shank into the hole, and the bushing shank and the pin shank have cooperable parts for expanding the bushing shank with the pin shank further inserted into the bushing shank, the cooperable parts including tip portions of the pin shank adjacent to the groove and tip portions of the bushing shank.

8. A pin and bushing fastener according to claim 7, wherein the pawl has inwardly inclined surfaces at opposite sides of the extending part.

9. A pin and bushing fastener according to claim 7, wherein tip portions of the pin shank and tip portions of the bushing shank have mutually engageable elements that maintain the expansion of the bushing shank.

10. A pin and bushing fastener according the claim 7, wherein the pin has a tip at an end opposite to the head, the groove is adjacent to the tip, the pin shank has a thick portion spaced from the tip and located in the hole when the pin shank is substantially fully inserted into the bushing shank, the pin shank has a constant diameter thinner portion extending between the groove and the thick portion, and the tip of the pawl engages the thinner portion adjacent to the thick portion when the pin shank is fully inserted in the bushing shank.

11. A pin and bushing fastener according to claim 9, wherein the mutually engageable elements include a shoulder of the groove, and a part of the bushing shank located in the groove adjacent to the shoulder.

* * * * *